(12) United States Patent
Welborn et al.

(10) Patent No.: US 7,352,793 B2
(45) Date of Patent: Apr. 1, 2008

(54) SYSTEM AND METHOD FOR ULTRA WIDEBAND COMMUNICATIONS USING MULTIPLE CODE WORDS

(75) Inventors: Matthew L. Welborn, Vienna, VA (US); Timothy R. Miller, Arlington, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 594 days.

(21) Appl. No.: 10/952,813

(22) Filed: Sep. 30, 2004

(65) Prior Publication Data

US 2006/0067450 A1 Mar. 30, 2006

(51) Int. Cl.
*H04B 1/00* (2006.01)
(52) U.S. Cl. ............... 375/130; 375/239; 375/256; 375/259; 375/295; 375/316
(58) Field of Classification Search ............... 375/130, 375/239, 256, 259, 295, 316
See application file for complete search history.

(56) References Cited

U.S. PATENT DOCUMENTS 6,574,731 B1 * 6/2003 Coles et al. ............... 713/168

2003/0067963 A1 * 4/2003 Miller et al. ............... 375/130
2003/0174048 A1 * 9/2003 McCorkle ............... 340/10.34
2003/0199279 A1 * 10/2003 Roberts ............... 455/452.2
2005/0265218 A1 * 12/2005 Molisch et al. ............... 370/203

OTHER PUBLICATIONS

International Preliminary Search Report and Written Opinion dated Jul. 2, 2007 in corresponding PCT application No. PCT/US05/35196.
Notification Concerning Transmittal of Copy of International Preliminary Report on Patentability (Chapter 1 of the Patent Cooperation Treaty) dated Oct. 18, 2007 in corresponding PCT application No. PCT/US05/35196.

* cited by examiner

*Primary Examiner*—Mohammed Ghayour
*Assistant Examiner*—Juan Alberto Torres (57) ABSTRACT

A method is provided for operating a wireless device. In this method, a first operation is performed on a wireless signal using a first group of wavelets arranged according to a first analog code word format (720). A second operation is then performed on the wireless signal using a second group of wavelets arranged according to a second analog code word format (740). The first code word format can be different in content and in size from the second code word format. By choosing different properties for each analog code word format, the device can optimize the performance of each operation. These operations can be performed in receiving process (800) or a transmission process (900).

22 Claims, 6 Drawing Sheets

SYSTEM AND METHOD FOR ULTRA WIDEBAND COMMUNICATIONS USING MULTIPLE CODE WORDS

FIELD OF THE INVENTION

The present invention relates in general to wireless communication systems, such as ultrawide bandwidth (UWB) systems, including mobile transceivers, centralized transceivers, related equipment, and corresponding methods. Another aspect of the present invention relates to a wireless transceiver that can perform multiple operations using different code words for each operation. Another aspect of the present invention relates to a method and circuit for changing the code words used during operation.

BACKGROUND OF THE INVENTION

Ultrawide bandwidth (UWB) signals allow large amounts of data to be sent very rapidly at very low power. Data in a UWB signal is generally sent in one or more very narrow duration (i.e., very high frequency) wavelets (also called chips). It is desirable to arrange these wavelets in such a way as to increase the speed of operations while reducing the signal power as much as possible.

UWB wavelets can be generated in a variety of different manners. In some embodiments they can be Gaussian monopulses. In others, they can be repeated cycles of a sinusoid. In still others they can have different desirable forms.

Figure 1:
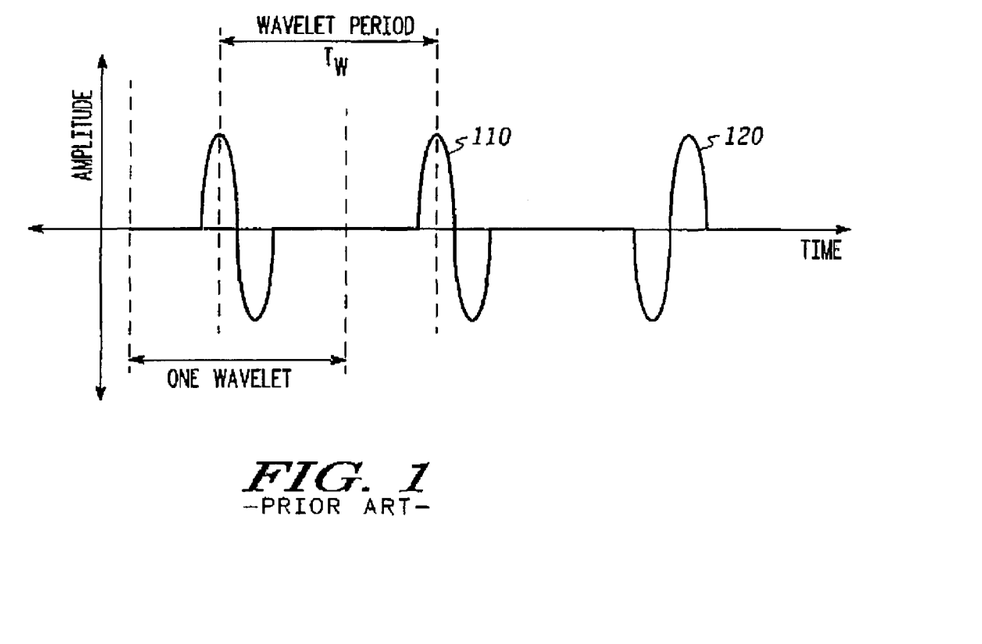
FIG. 1 is a graph of a UWB wavelet stream using monopulse wavelets according to a disclosed embodiment of the present invention.

FIG. 1 is a graph of a UWB wavelet stream using monopulse wavelets according to a disclosed embodiment of the present invention. Here the pulse is a Gaussian monopulse with a wavelet period $T_w$ (also called a chipping period) of several nanoseconds, and a bandwidth of several gigahertz.

One embodiment of a UWB system uses signals that are based on trains of short duration pulses for the wavelets. These wavelets are formed using a single basic pulse shape. The interval between individual pulses can be uniform or variable, and there are a number of different methods that can be used for modulating the pulse train with data for communications.

In this embodiment these individual pulses are very short in duration, typically much shorter than the interval corresponding to a single bit, which can offer advantages in resolving multipath components. We can represent a general UWB pulse train signal for this embodiment as a sum of pulses shifted in time, as shown in Equation 1:

$$s(t) = \sum_{k=-\infty}^{\infty} a_k p(t - t_k) \quad (1)$$

Here s(t) is the UWB signal, p(t) is the basic pulse (i.e., wavelet) shape, and $a_k$ and $t_k$ are the amplitude and time offset for each individual pulse. Because of the short duration of the pulses, the spectrum of the UWB signal can be several gigahertz or more in bandwidth.

Figure 2:
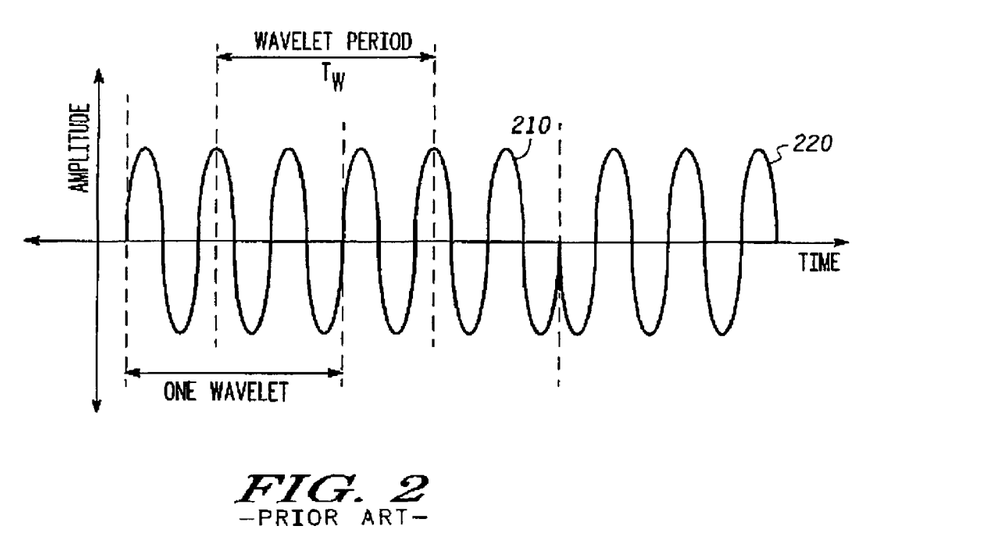
FIG. 2 is a graph of a UWB wavelet stream using repeated cycles of a sinusoid as wavelets according to a disclosed embodiment of the present invention.

FIG. 2 is a graph of a UWB wavelet stream using repeated cycles of a sinusoid as wavelets according to a disclosed embodiment of the present invention. As shown in FIG. 2, each wavelet is formed from three consecutive cycles of a sinusoidal signal. As a result, in this embodiment the wavelet period $T_w$ (also called the chipping period) is three times the period of the sinusoid, i.e., the wavelet has a wavelet frequency $F_w$ (also called a chipping frequency) that is ⅓ the frequency of the sinusoid. However, although three repeated cycles are used to form a wavelet, alternate embodiments could vary the number of cycles used.

As shown in FIGS. 1 and 2, for binary encoding of data, the wavelets can be modulated into either an inverted wavelet 110 or 210 or a non-inverted wavelet 120 or 220.

One common characteristic in these embodiments is that the wavelet train is transmitted without translation to a higher carrier frequency, and so UWB transmissions using these sorts of pulses are sometimes also termed "carrierless" radio transmissions. In other words, in this embodiment a UWB system drives its antenna directly with a baseband signal.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

One way to enhance operation speed and effectiveness is to encode data into groups of wavelets called code words rather than just encoding the data into individual wavelets. These code words can have different properties depending upon what operations they are used for. To further increase a devices' speed and effectiveness, it can use different code words, having different properties, for separate aspects of device operation. In this way the code words for any given operation can be catered to that specific operation and need not be particularly effective for any other operation.

Code Words

As noted above, in a UWB system, a series of wavelets can be grouped into a code word, which can then be used to encode data. The code words can also be referred to as symbols in some embodiments. In a binary system, a series of non-inverted wavelets and inverted wavelets are chosen to represent a "0" and its inverse wavelet set is chosen to represent a "1." In a ternary system, a series of non-inverted wavelets, inverted wavelets, and null wavelets (i.e., the absence of a wavelet) are chosen to represent a "0" and its inverse are chosen to represent a "1." In this case the inverse of a null wavelet is also a null wavelet.

These sets of wavelets called code words are used to transfer data at a given data rate, with each code word corresponding to one or more bits of information to be transferred. The code words have a code word period $T_{cw}$ (also called a symbol period) indicating the duration of an code word, and a related code word frequency $F_{cw}$. This may correspond to the data rate, though it does not have to. FIGS. 3 to 6 are graphs showing exemplary code words.

Figure 3:
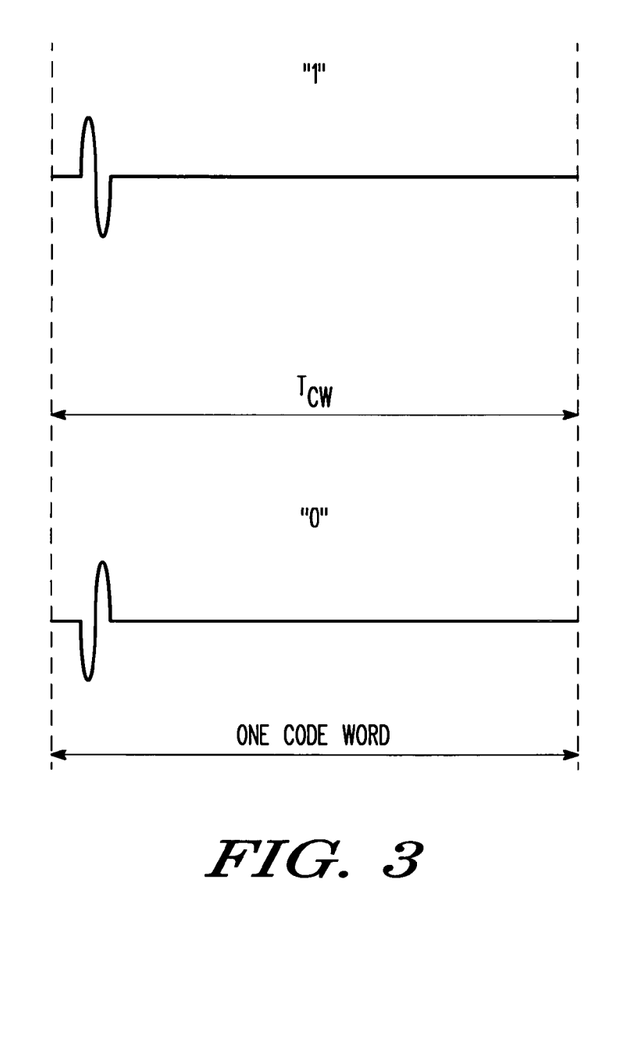
FIG. 3 is a graph of a length six sparse code word using monopulse wavelets according to a disclosed embodiment of the present invention.

FIG. 3 is a graph of a length six sparse code word using monopulse wavelets according to a disclosed embodiment of the present invention. This simple example has a ternary encoded code word that includes a single non-inverted wavelet and five null wavelets, which can be called a sparse code word. As shown in FIG. 3, in this exemplary embodiment a non-inverted wavelet followed by five null wavelets corresponds to a "1," and an inverted wavelet followed by five null wavelets (i.e., the inverse of the first code word) corresponds to a "0."

The orientation of the first wavelet could be reversed for alternate embodiments. In addition, the code word length can be other than six. In alternate embodiments a sparse code word can be any length desired. A length N code word will use a non-inverted (or inverted) wavelet followed by (N-1) null wavelets to represent a "1" and the inverse to represent a "0."

Figure 4:
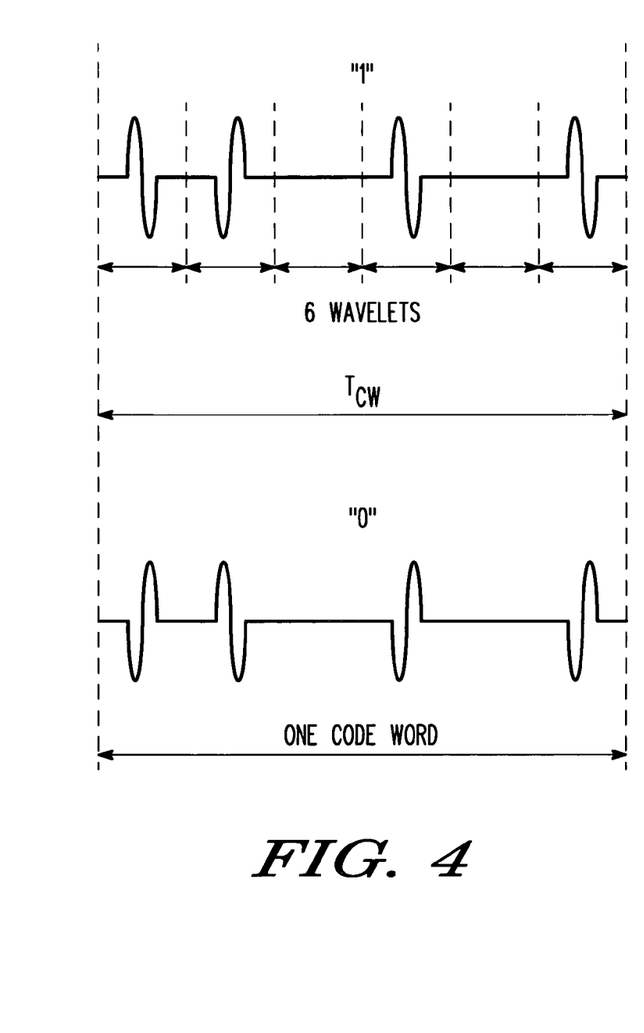
FIG. 4 is a graph of a length six non-sparse code word using monopulse wavelets according to a disclosed embodiment of the present invention.

Also, the placement of the inverted or non-inverted wavelet can be modified in alternate embodiments, i.e., it need not always be the first wavelet in the code word. For example, a length 6 sparse wavelet could include three null wavelets followed by a non-inverted wavelet, followed by two more null wavelets. Any other variation of wavelet placement is possible FIG. 4 is a graph of a length six non-sparse code word using monopulse wavelets according to a disclosed embodiment of the present invention. This embodiment has a code word that includes six ternary-encoded wavelets. In this case the code word period $T_{cw}$ is six times the wavelet period $T_w$ (i.e., the code words are transmitted at one-sixth the frequency of the wavelets).

In other words:

$$T_{cw} = n * T_w \qquad (1)$$

for an n-wavelet code word. Thus, the wavelet period $T_w$ and number of wavelets n per code word determine the period of the code word $T_{cw}$.

As shown in FIG. 4, a particular orientation of the six wavelets corresponds to a "1," and the inverse of this orientation corresponds to a "0." The particular choice of wavelet orientation and arrangement within the code word can be varied as necessary, with different code words being used for different functions. Regardless, it is helpful if the "1" and "0" code words remain the inverse of each other, though it is not absolutely necessary.

Figure 5:
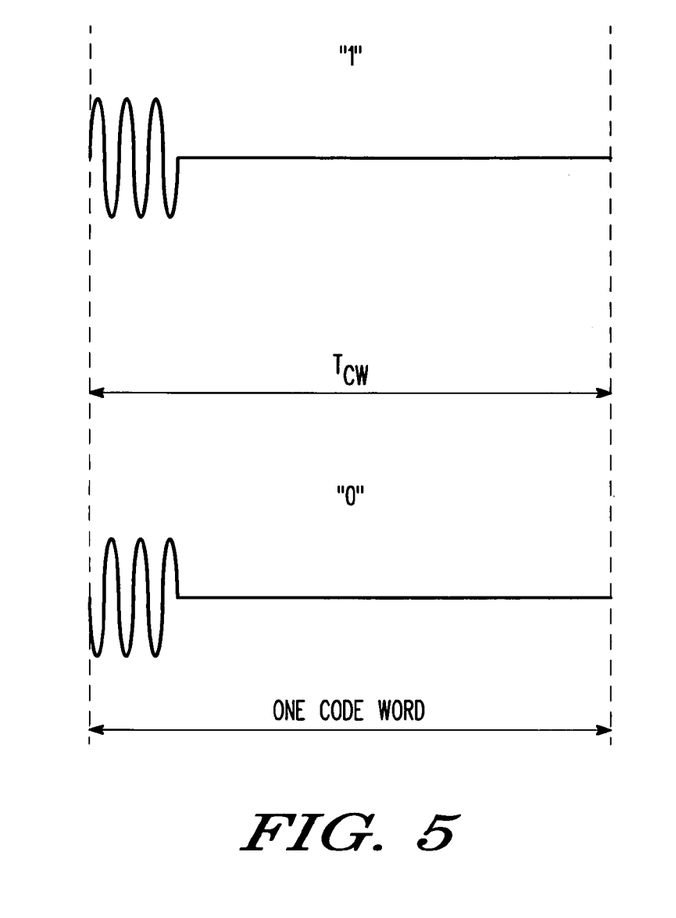
FIG. 5 is a graph of a length six sparse code word using repeated cycles of a sinusoid as wavelets according to a disclosed embodiment of the present invention.

FIG. 5 is a graph of a length six sparse code word using repeated cycles of a sinusoid as wavelets according to a disclosed embodiment of the present invention. This simple example has a ternary encoded code word that includes a single non-inverted wavelet followed by five null wavelets, which can be called a sparse code word. As shown in FIG. 5, in this exemplary embodiment a non-inverted wavelet followed by five null wavelets corresponds to a "1," and an inverted wavelet followed by five null wavelets (i.e., the inverse of the first code word) corresponds to a "0." This could be reversed for alternate embodiments.

In addition, the code word length can be other than six. In alternate embodiments a sparse code word can be any length desired. A length N code word will use a non-inverted (or inverted) wavelet followed by (N-1) null wavelets to represent a "1" and the inverse to represent a "0."

Figure 6:
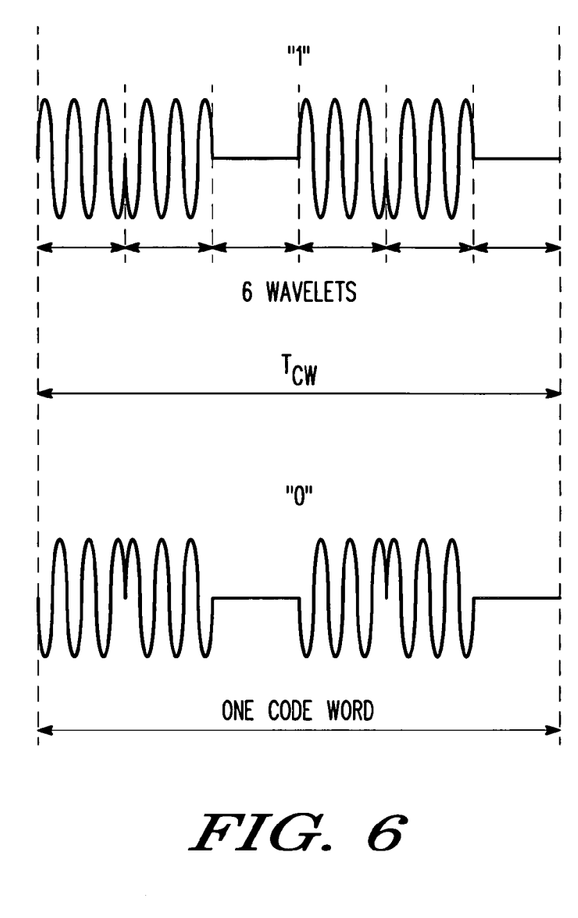
FIG. 6 is a graph of a length six non-sparse code word using repeated cycles of a sinusoid as wavelets according to a disclosed embodiment of the present invention.

Also, the placement of the inverted or non-inverted wavelet can be modified in alternate embodiments, i.e., it need not always be the first wavelet in the code word. For example, a length 6 sparse wavelet could include three null wavelets followed by a non-inverted wavelet, followed by two more null wavelets. Any other variation of wavelet placement is possible FIG. 6 is a graph of a length six non-sparse code word using repeated cycles of a sinusoid as wavelets according to a disclosed embodiment of the present invention. This embodiment has a code word that includes six ternary-encoded wavelets. In this case the code word period $T_{cw}$ is six times the wavelet period $T_w$ (i.e., the code words are transmitted at one-sixth the frequency of the wavelets). As shown in Equation (1), the wavelet period $T_w$ and number of wavelets n per code word determine the period of the code word $T_{cw}$.

As shown in FIG. 6, a particular orientation of the six wavelets corresponds to a "1," and the inverse of this orientation corresponds to a "0." The particular choice of wavelet orientation and arrangement within the code word can be varied as necessary, with different code words being used for different functions. Regardless, it is helpful if the "1" and "0" code words remain the inverse of each other.

Although FIGS. 3 to 6 disclose embodiments using code words of length 6, other lengths may be used. For example, some alternate embodiments may employ code words of length 1, length 2, length 4, length 6, length 12, and length 24, though other code word lengths are possible. Table 1 shows an exemplary embodiment using three cycles of a sinusoid as a wavelet. These code words are used for data transmission. In this embodiment the wavelet frequency (i.e., the chipping frequency is 1.3 GHz), and the code word frequency (i.e., the symbol frequency) vary depending upon the size of the code word. Forward error correction (FEC) is used for some data rates.

TABLE 1

Exemplary Code Word Lengths

| Code Word Length | Code Word Rate | FEC Rate | Data Rate |
|---|---|---|---|
| L = 24 | $F_w/24$ | ½ | 28 Mbps |
| L = 12 | $F_w/12$ | ½ | 55 Mbps |
| L = 6 | $F_w/6$ | ½ | 110 Mbps |
| L = 3 | $F_w/3$ | ½ | 220 Mbps |

TABLE 1-continued

Exemplary Code Word Lengths

| Code Word Length | Code Word Rate | FEC Rate | Data Rate |
|---|---|---|---|
| L = 2 | $F_w/2$ | ¾ | 500 Mbps |
| L = 2 | $F_w/2$ | 1 | 660 Mbps |
| L = 1 | $F_w$ | ¾ | 1000 Mbps |
| L = 1 | $F_w$ | 1 | 1320 Mbps |

As shown in Table 1, in this embodiment a variety of different code word lengths (and thus different code words) can be used depending upon the data rate desired for data transmission.

In addition, although FIGS. 4 and 6 disclose the use of ternary encoding, alternate embodiments can employ other types of encoding, e.g., binary encoding, multi-level binary encoding, etc.

Also, although in the embodiments described above only a single bit of data is encoded in each code word, alternate embodiments can be used in which multiple bits of data are encoded in a single code word. In this case multiple code words must be employed to represent each of the possible multiple bit combinations.

One advantage with using a code word is that it is possible to spread out a required transmission power over multiple wavelets. For a successful transmission, it's necessary to use a certain amount of energy to send each bit. If the bit is sent in a single wavelet, that wavelet has to include all of the needed energy. This requires a larger wavelet and increases the peak-to-average ratio of the signal (i.e., the entire waveform). However, if six wavelets are used to send a single bit of data (as shown in the embodiment of FIGS. 3 to 6), the energy can be spread out among six separate wavelets. Thus, each individual wavelet can be smaller and can have a lower peak-to-average ratio.

In addition, it is possible to choose different codes for different situations such that they perform to meet desired criteria. For example some code words will have better code isolation with respect to each other. This is useful during an acquisition process where a receiver must start from scratch to determine the phase of an incoming signal. In this case, the receiver will be cycling its phase to try and find the proper acquisition phase. This could easily cause it to interfere with other code words being transmitted in adjacent UWB networks. As a result, it would be desirable to perform acquisition with code words that have good code isolation properties to minimize this interference.

Tables 2 and 3 contain selections of exemplary code words that have good code isolation properties. In particular, Table 2 lists six length 24 codes and Table 3 lists six length 12 codes. The use of longer codes will serve to reduce data transmission rate while improving code word isolation. However, since only acquisition information is transmitted during acquisition, this does not seriously limit operation.

TABLE 2

Length 24 Code Words with Good Code Isolation

| Code Set | L-24 Code Words |
|---|---|
| 1 | -1, 0, 1, -1, -1, -1, 1, 1, 0, 1, 1, 1, 1, -1, 1, -1, 1, 1, 1, -1, 1, -1, -1, 1 |
| 2 | -1, -1, -1, -1, 1, -1, 1, -1, 1, -1, -1, 1, -1, 1, 1, -1, -1, 1, 1, 0, -1, 0, 1, 1 |

TABLE 2-continued

Length 24 Code Words with Good Code Isolation

| Code Set | L-24 Code Words |
|---|---|
| 3 | -1 1 -1 -1 1 -1 -1 1 -1 0 -1 0 -1 -1 1 1 1 -1 1 1 1 -1 -1 -1 |
| 4 | 0 -1 -1 -1 -1 -1 -1 1 1 0 -1 1 1 -1 1 -1 -1 1 1 -1 1 -1 1 -1 |
| 5 | -1 1 -1 1 1 -1 1 0 1 1 1 -1 -1 1 1 1 -1 1 1 1 -1 -1 -1 0 -1 |
| 6 | 0 -1 -1 0 1 -1 -1 1 1 -1 -1 1 1 1 1 -1 -1 1 -1 1 -1 1 1 1 1 |

TABLE 3

Length 12 Code Words with Good Code Isolation

| Code Set | L-12 Code Words |
|---|---|
| 1 | 0 -1 -1 -1 1 1 1 -1 1 1 -1 1 |
| 2 | 0 -1 1 -1 -1 1 1 -1 -1 -1 1 1 1 |
| 3 | -1 -1 -1 1 1 1 -1 1 1 -1 1 0 |
| 4 | -1 1 -1 -1 1 1 -1 -1 -1 1 1 1 0 |
| 5 | 1 -1 1 1 -1 1 1 1 -1 -1 -1 0 |
| 6 | 1 1 1 -1 -1 -1 1 1 -1 -1 1 -1 0 |

Although only six length 24 codes and six length 12 codes are disclosed, other code words of the same or different lengths can be used in alternate embodiments. These code words are simply provided by way of example.

Different code words can also be used to provide better autocorrelation properties. In this case, the code words are chosen for the way they correlate with themselves, e.g., so that they provide the largest possible autocorrelation value when correlated with itself.

Code words with good autocorrelation values may be unsuitable for acquisition in multi-user environments since they may have poor code isolation properties, but are ideal for training. This is because by the time a device is ready to train, it must already have successfully performed acquisition. And since the proper phase has been acquired for the incoming signal, the danger of interference with other networks is lessened, and the need for high code isolation is reduced.

One good example of code words with good autocorrelation values are sparse code words, i.e., code words made of a single inverted or non-inverted wavelet with the remainder of the code word being null wavelets.

In addition to acquisition and training, other varieties of code words can be used in other situations. For example, where data transmission speed is desirable, shorter code words can be used; where distance is required, longer code words can be used. And while these code words may not have good code isolation or cross correlation, they will provide adequate performance since the system has already successfully performed acquisition and training. In another situation, a code that is well suited to a ranging operation could be used. Again, any deficiencies it may have in terms of code isolation and cross correlation may be made up for by the results of acquisition and training. In yet another implementation varied code words can be used for security purposed. Other possible criteria for choosing code words can also be used.

Regardless, by using different code words for different operations, the disclosed system can enhance the operation of those operations without detracting from the performance of other operations.

In the description above, the code words are analog code words. This refers to the code words that are used in place of simple wavelets. It is also possible to further arrange analog code words into digital code words to enhance operation. In this case, multiple analog code words are encoded (e.g., by binary or ternary encoding) and strung together to form the digital code words. Thus, just as an analog code word is formed by a plurality of encoded wavelets, a digital code word is formed by a plurality of encoded analog code words.

Furthermore, although each operation in a UWB device requires at least two code words, i.e., a non-inverted code word to represent a "1" and an inverted code word to represent a "0," for ease of discussion, each code word pair will simply be referred to as a code word.

System Operation

Figure 7:
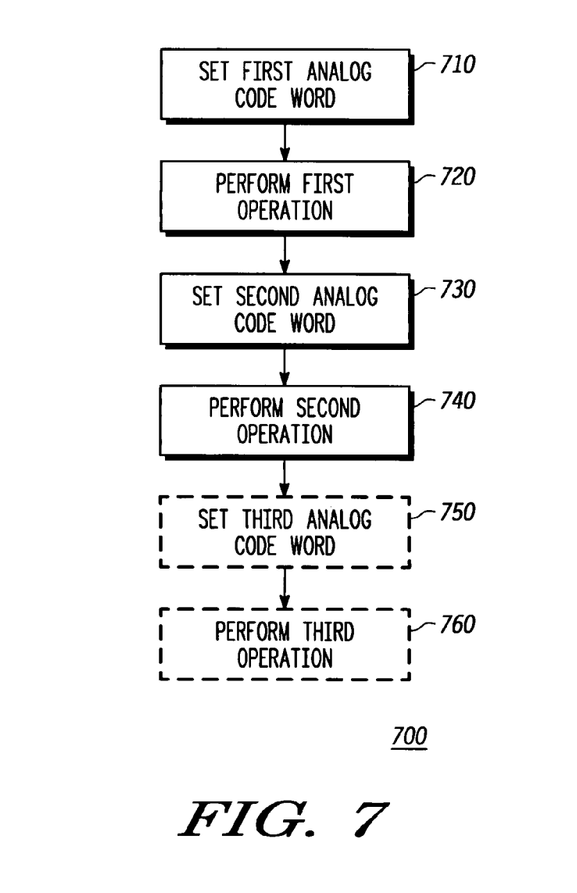
FIG. 7 is a flow chart of a multiple code word operation for a UWB device according to a disclosed embodiment of the present invention.

As noted above, in operation a UWB device can cycle through multiple code words for use in multiple different operations. FIG. 7 is a flow chart of a multiple code word operation for a UWB device according to a disclosed embodiment of the present invention.

As shown in FIG. 7, the UWB device begins the operation 700 by setting a first analog code word as a current code word. (Step 710) This first analog code word is then used to perform a first operation. (Step 720)

Once the first operation is completed, the UWB device sets a second analog code word as a current code word. (Step 730) This second analog code word is then used to perform a second operation. (Step 740)

Optionally, once the second operation is completed, the UWB device can set a third analog code word as a current code word. (Step 750) This third analog code word can then be used to perform a third operation. (Step 760)

Although only three possible code word selections are shown for use in three separate operations, alternate embodiments could employ more or fewer code word changes for various operations.

In a case where two operations are used (Steps 710 to 740), the first operation could be acquisition, while the second operation could be training and data transmission. In other embodiments the training operation could be omitted such that the first operation is acquisition and the second operation is simply data transmission. In a case where three operations are used (Steps 710 to 760), the first operation could be acquisition, the second operation could be training, and the third operation could be data transmission. Data transmission could be replaced as an operation in any of these examples by a ranging function, a security function, or any other desired function for a UWB device.

In various embodiments, the first, second, and third analog code words do not necessarily have to have the same length. They may have the same length; they may all have different length; or some may have the same lengths and others different lengths. In one particular example using two analog code words, a first analog code word for acquisition and a second analog code word for data transmission, the first analog code word is longer than the second analog code word.

Figure 8:
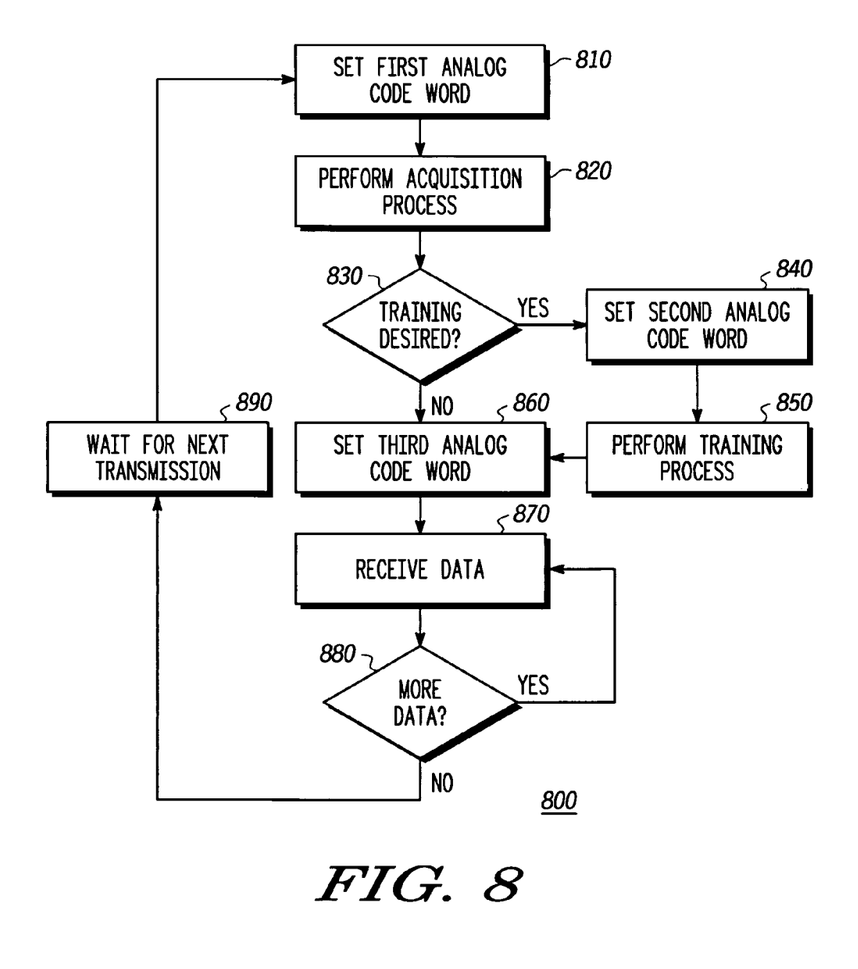
FIG. 8 is a flow chart of a multiple code word receiving operation for a UWB receiver according to a disclosed embodiment of the present invention.
Figure 9:
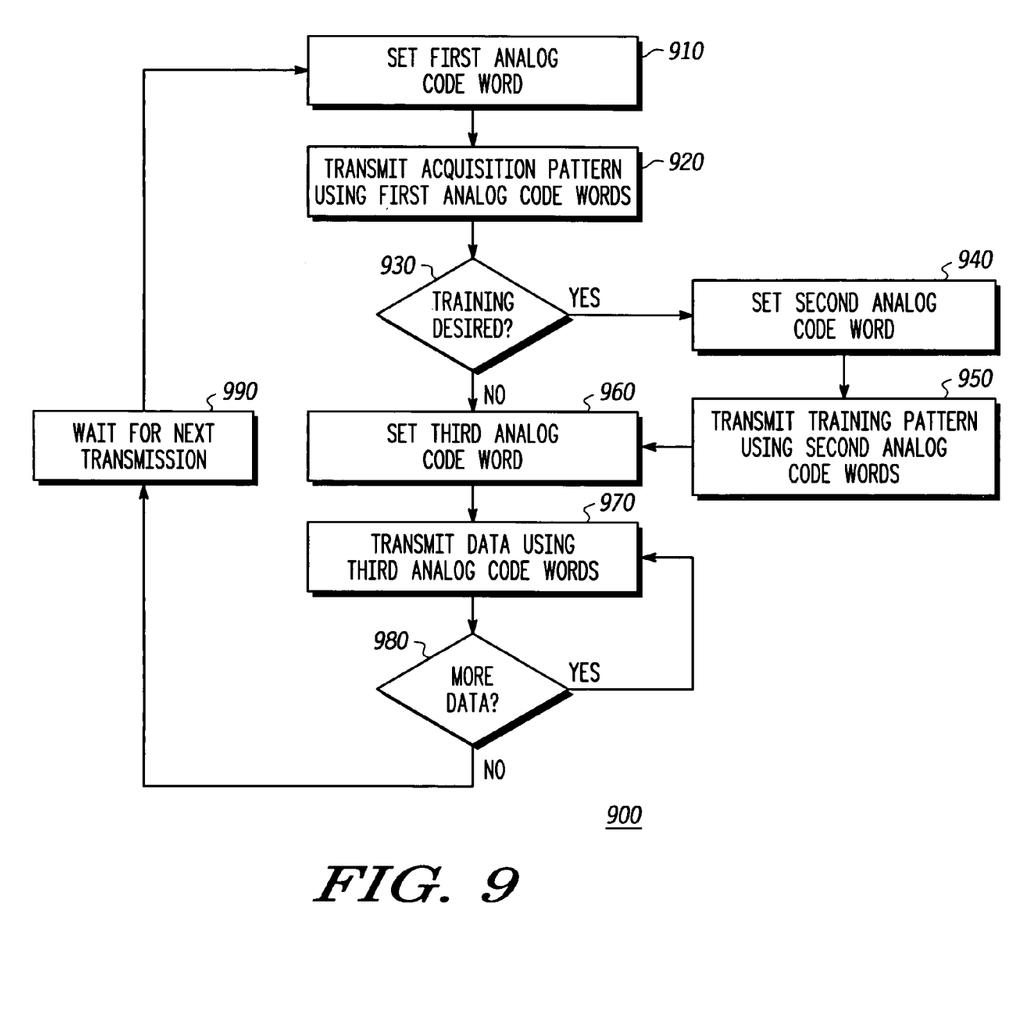
FIG. 9 is a flow chart of a multiple code word transmitting operation for a UWB transmitter according to a disclosed embodiment of the present invention.

FIGS. 8 and 9 show specific examples of the operation of a UWB receiver and transmitter using multiple code words. FIG. 8 is a flow chart of a multiple code word receiving operation for a UWB receiver according to a disclosed embodiment of the present invention, while FIG. 9 is a flow chart of a multiple code word transmitting operation for a UWB transmitter according to a disclosed embodiment of the present invention.

As shown in FIG. 8, the receiver begins the receiving operation 800 by setting a first analog code word as a current code word. (Step 810) In this embodiment the first analog code word is chosen to be well suited to acquisition, e.g., it has good code isolation properties.

The receiver then performs an acquisition process using the first analog code word. (Step 820) Because the first analog code word has properties that are suited to acquisition, this process is performed quickly and efficiently.

The receiver then determines whether a training process is desired. (Step 830) If so, it sets a second analog code word as the current code word (Step 840) and then performs the training process using the second analog code word. (Step 850) This second analog code word is chosen to have properties that are suited to training, e.g., good cross correlation, so the training operation can be performed quickly and efficiently.

Then, either after training (Step 850) or if it is determined that no training is desired (830), the UWB receiver sets a third analog code word as the current code word. (Step 860) In this embodiment the third code word is chosen to allow for ideal transmission characteristics, e.g., rapid data transmission. Because acquisition and training are completed, this third code word can sacrifice some of the characteristics of good code isolation and good cross correlation in order to achieve its desired transmission characteristics.

The UWB receiver then proceeds to receive data using the third code word (Step 870), checking repeatedly to see if more data is coming. (Step 880). So long as data continues to arrive, the receiver will continue to receive it using the third code word.

Once the data stream is completed, the UWB receiver waits for the next transmission (Step 890) and then again sets the first analog code word as the current code word (Step 810) for a new signal acquisition process.

Although three separate code words are described, more or fewer code words could be used in alternate embodiments. For example, in some embodiments the second and third code words could be the same. In other embodiments additional operations could be performed using still different code words.

As shown in FIG. 9, the transmitter begins the transmitting operation 900 by setting a first analog code word as the current code word. (Step 910) In this embodiment the first analog code word is chosen to be well suited to acquisition, e.g., it has good code isolation properties.

The transmitter then transmits a known acquisition pattern using the first analog code word to allow a receiver to perform an acquisition process. (Step 920) Because the first analog code word has properties that are suited to acquisition, the receiver can perform this process quickly and efficiently.

The transmitter then determines whether a training process is desired. (Step 930) If so, it sets a second analog code word as the current code word (Step 940) and then transmits a training pattern using the second analog code words. (Step 950) This training pattern is used by the receiver to perform a training process. The second analog code word is chosen to have properties that are suited to training, e.g., good cross correlation, so the receiver can perform the training operation quickly and efficiently.

Then, either after the training pattern has been sent (Step 950) or if it is determined that no training is desired (930), the UWB transmitter sets a third analog code word as the current code word. (Step 960) In this embodiment the third code word is chosen to allow for ideal transmission characteristics, e.g., rapid data transmission. Because acquisition and training are completed, this third code word can sacrifice some of the characteristics of good code isolation and good cross correlation in order to achieve its desired transmission characteristics.

The UWB transmitter then proceeds to transmit data using the third code word (Step 970), checking repeatedly to see if there is more data to send. (Step 980). So long as data remains to send, the transmitter will continue to transmit it using the third code word.

Once the data stream is completed, the UWB transmitter waits for the next transmission (Step 990) and then again sets the first analog code word as the current code word (Step 910) for sending an acquisition pattern.

Although three separate code words are described, more or fewer code words could be used in alternate embodiments. For example, in some embodiments the second and third code words could be the same. In other embodiments additional operations could be performed using still different code words.

In addition, although FIGS. 8 and 9 disclose a process for use in a transmitter or receiver, a single transceiver can perform both operations in turn. In this case the transceiver will follow its respective flow chart when acting as a transmitter or receiver, and will switch between the two processes as it switches transmit and receive functions.

Regardless of how the code word selection is done, this selection should be coordinated with the transmitter and receiver. In other words, at every point where the current code word will change, both the transmitter and receiver should be aware of the change.

Code Word Generator

Figure 10:
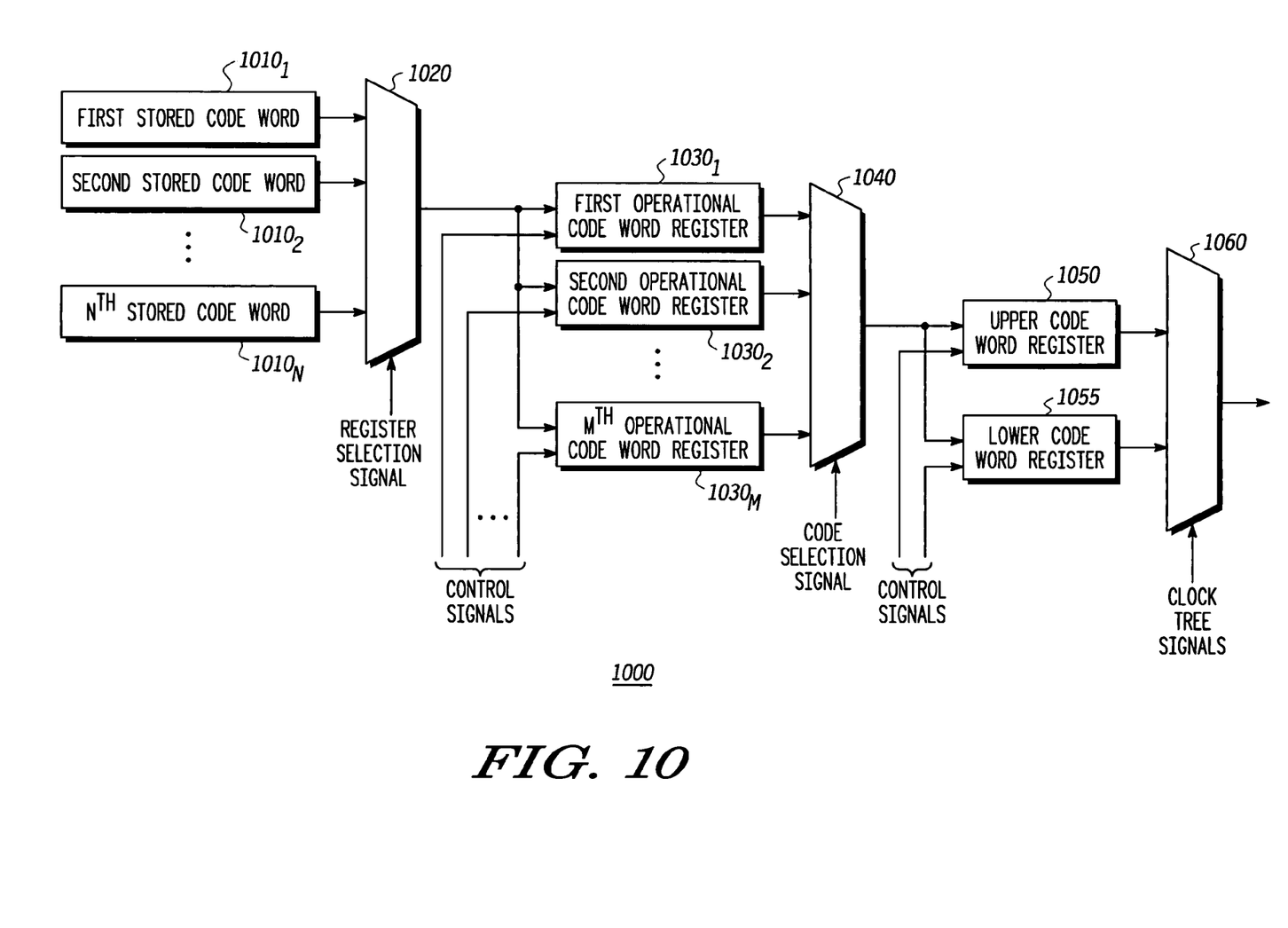
FIG. 10 is a block diagram of a code word generator for generating a binary encoded code word according to a disclosed embodiment of the present invention.

FIG. 10 is a block diagram of a code word generator for generating a binary encoded code word according to a disclosed embodiment of the present invention. As shown in FIG. 10, the code word generator 1000 includes first through $N^{th}$ stored code word registers $1010_1$ to $1010_N$, a stored register multiplexer 1020, first through $M^{th}$ operational code word registers $1030_1$ to $1030_M$, an operational register multiplexer 1040, an upper code register 1050, a lower code register 1055, and an upper/lower register multiplexer 1060. In one embodiment this circuit could be implemented in an integrated circuit.

The first through $N^{th}$ stored code word registers $1010_1$ to $1010_N$ are each length C registers (where C is the maximum code word length) that store first through $N^{th}$ stored code words, respectively. These stored code words represent all of the various code words that could be generated by the code word generator 1000. This may include more code words than available functions, providing multiple code words available for any given function. For example, the first through $N^{th}$ stored code words might include multiple acquisition code words to allow a system to switch between them to avoid interference. Or they might have multiple data transmission code words to account for differing maximum ranges and data rates.

In the disclosed embodiment all of the code words are of a length that is an integer divisor of the maximum code word length C. Any code words that have a length less than the maximum code word length C are repeated an integer number of times to fill the respective one of the first through $N^{th}$ stored code word registers $1010_1$ to $1010_N$.

The stored register multiplexer 1020, chooses one of the first through $N^{th}$ stored code words based on a register selection signal. The code word from the stored register multiplexer 1020 is then provided to inputs of the first through $M^{th}$ operational code word registers $1030_1$ to $1030_M$.

The first through $M^{th}$ operational code word registers $1030_1$ to $1030_M$ are each length C registers that store the code words that a device will actually use in current operations, i.e., the ones that it will need in the short term. For example, if (M=3), the first operational code word register $1030_1$ could hold the acquisition code word, the second operational code word register $1030_2$ could hold a training code word, and a third operational code word register $1030_3$ could hold a data transmission code word.

Control signals to each of the first through $M^{th}$ operational code word registers $1030_1$ to $1030_M$ instruct the registers as to when they should store the value received from the register selection multiplexer 1020.

As noted above, in the disclosed embodiment all of the code words are of a length that is an integer divisor of the maximum code word length C. Any code words that have a length less than the maximum code word length C are repeated an integer number of times to fill the respective one of the first through $M^{th}$ operational code word registers $1030_1$ to $1030_M$.

The operational register multiplexer 1040 chooses one of the first through $M^{th}$ operational code words based on a code selection signal. The code word from the operational register multiplexer 1040 is then provided to inputs of the upper code word register 1050 and the lower code word register 1055.

The upper and lower code word registers 1050 and 1055 are half the size of the operational code registers $1030_1$ to $1030_N$ in this embodiment, and store code word that is actually being used. The upper code word register 1050 stores the first half of the current code word, while the lower code word register 1055 stores the second half of the current code word. Where the code word length is less than the maximum code word length C, each of the upper and lower code word registers 1050 and 1055 will contain one or more iterations of the current code word.

In the disclosed embodiment the stored code word registers $1010_1$ to $1010_N$ and the operational code registers $1030_1$ to $1030_N$ are of length 24 and the upper and lower code word registers 1050 and 1055 are of length 12, though this could be changed in alternate embodiments.

The upper/lower register multiplexer 1060 operates to sequentially select the values from the upper code word register 1050 and the lower code word register 1055 and output them as a sequential stream along an output. In the disclosed embodiment this is done in response to a series of clock tree signals that sequentially enable one of the plurality of input lines of the upper/lower register multiplexer 1060.

Although in the embodiment disclosed in FIG. 10, the current code is stored in an upper and lower code register, alternate embodiments could eliminate this and simple provide a single code resister that contains the current code. However, by splitting up the current code word into an upper and lower half, the disclosed embodiment can better facilitate dynamically changing the current code word during device operation.

The output of the upper/lower register multiplexer 1060 can then be provided to a mixer that mixes the output with a wavelet source to produce a signal for transmission.

The code generator 1000 of FIG. 10 is used to generate a binary code. Alternate embodiments that employ a ternary code can use two synchronized versions of the code generator 1000 in parallel. A first code generator can indicate whether the current bit should be inverted or non-inverted, and a second code generator can indicate whether the current bit should be a null bit or a non-null bit. These two outputs can then be mixed to generate a ternary code word.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for operating a wireless receiver, comprising:
performing a first operation on a received wireless signal using a first plurality of wavelets arranged according to a first analog code word format; and
performing a second operation on the wireless signal using a second plurality of wavelets arranged according to a second analog code word format, after performing the first operation,
wherein the first analog code word format is different from the second analog code word format.

2. A method for operating a wireless receiver, as recited in claim 1, wherein the first operation is one of: acquisition, synchronization, and signal training.

3. A method for operating a wireless receiver, as recited in claim 1, wherein the second operation is one of signal training, clear transmission of data, secure transmission of data, and distance measurement.

4. A method for operating a wireless receiver, as recited in claim 1, wherein the first and the second code word formats are both encoded using one of ternary encoding and binary encoding.

5. A method for operating a wireless receiver, as recited in claim 1, wherein the first code word format and the second code word format are of different lengths.

6. A method for operating a wireless receiver, as recited in claim 1, further comprising performing a third operation on the wireless signal using a third plurality of wavelets arranged according to a third analog code word format, after performing the second operation.

7. A method for operating a wireless receiver, as recited in claim 6,
wherein the first operation is one of acquisition and synchronization,
wherein the second operation is signal training, and
wherein the third operation is one of clear transmission of data, secure transmission of data, and distance measuring.

8. A method for operating a wireless receiver, as recited in claim 1, wherein the method is implemented in an ultra wideband receiver.

9. A method for operating a wireless receiver, as recited in claim 1, wherein the method is implemented in an integrated circuit.

10. A method for operating a wireless transmitter, comprising:
transmitting a first plurality of wavelets arranged according to a first analog code word format, for use in a first operation at a wireless receiver; and
transmitting a second plurality of wavelets arranged according to a second analog code word format, after transmitting the first plurality of wavelets, for use in a second operation at the wireless receiver,
wherein the first analog code word format is different from the second analog code word format.

11. A method for operating a wireless transmitter, as recited in claim 10, wherein the first operation is one of: acquisition, synchronization, and signal training.

12. A method for operating a wireless transmitter, as recited in claim 10, wherein the second operation is one of: signal training, clear transmission of data, secure transmission of data, and distance measurement.

13. A method for operating a wireless transmitter, as recited in claim 10, wherein the first and the second code word formats are both encoded using one of ternary encoding or binary encoding.

14. A method for operating a wireless transmitter, as recited in claim 10, wherein the first code word format and the second code word format are of different lengths.

15. A method for operating a wireless transmitter, as recited in claim 10, further comprising transmitting a third plurality of wavelets arranged according to a third analog code word format, after transmitting the second plurality of wavelets, for use in a third operation at the wireless receiver.

16. A method for operating a wireless transmitter, as recited in claim 15,
wherein the first operation is one of acquisition and synchronization,
wherein the second operation is signal training, and
wherein the third operation is one of clear transmission of data, secure transmission of data, and distance measuring.

17. A method for operating a wireless transmitter, as recited in claim 10 wherein the method is implemented in an ultra wideband transmitter.

18. A method for operating a wireless transmitter, as recited in claim 10, wherein the method is implemented in an integrated circuit.

19. A wireless device, comprising:
a plurality of stored code word registers for providing a plurality of first multiplexer input signals; p1 a first multiplexer for choosing one of the plurality of first multiplexer input signals to pass as a first multiplexer output signal;
a plurality of operational code word registers for selectively receiving the first multiplexer output signal from the first multiplexer, and for providing a plurality of second multiplexer input signals; and
a second multiplexer for choosing one of the plurality of second multiplexer input signals to pass as a second multiplexer output signal,
wherein each of the plurality of operational code word registers stores a code word for use in a different operation in the wireless device.

20. A wireless device, as recited in claim 19, wherein the wireless device is one of: a wireless transmitter, a wireless receiver, and a wireless transceiver.

21. A wireless device, as recited in claim 19, further comprising:
   an upper code word register for storing a first portion of the second multiplexer output signal to provide as an upper code word signal;
   a lower code word generator for storing a second portion of the second multiplexer output signal to provide as a lower code word signal; and
   a third multiplexer for sequentially choosing one of the upper and lower code word signals a third multiplexer output signal.

22. A wireless device, as recited in claim 19, wherein the different operations are each one of: acquisition, synchronization, signal training, clear transmission of data, secure transmission of data, and distance measuring.

* * * * *

UNITED STATES PATENT AND TRADEMARK OFFICE
CERTIFICATE OF CORRECTION

| | |
|---|---|
| PATENT NO. | : 7,352,793 B2 |
| APPLICATION NO. | : 10/952813 |
| DATED | : September 30, 2004 |
| INVENTOR(S) | : Matthew L. Welborn |

Page 1 of 1

It is certified that error appears in the above-identified patent and that said Letters Patent is hereby corrected as shown below:

In Column 11, Line 41, Claim No. 3:

Change "wherein the second operation is one of signal" to --wherein the second operation is one of: signal--

In Column 12, Line 51, Claim No. 19:

Change "multiplexer input signals; p1 a first" to --multiplexer input signals; a first--

Signed and Sealed this

Twenty-second Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,352,793 B2 Page 1 of 1
APPLICATION NO. : 10/952813
DATED : April 1, 2008
INVENTOR(S) : Matthew L. Welborn It is certified that error appears in the above-identified patent and that said Letters Patent is hereby corrected as shown below:

In Column 11, Line 41, Claim No. 3:
Change "wherein the second operation is one of signal" to --wherein the second operation is one of: signal--

In Column 12, Line 51, Claim No. 19:
Change "multiplexer input signals; p1 a first" to --multiplexer input signals; a first--

This certificate supersedes the Certificate of Correction issued July 22, 2008.

Signed and Sealed this

Twelfth Day of August, 2008

JON W. DUDAS
*Director of the United States Patent and Trademark Office*